United States Patent [19]
Makishima

[11] 4,331,177
[45] May 25, 1982

[54] PIPE COUPLING

[75] Inventor: Reichi Makishima, Yokohama, Japan

[73] Assignee: Nitto Kohki Co., Ltd., Tokyo, Japan

[21] Appl. No.: 102,265

[22] Filed: Dec. 10, 1979

[30] Foreign Application Priority Data

May 4, 1979 [JP] Japan .................................. 54/55388

[51] Int. Cl.³ ........................ F16K 37/00; F16L 37/28
[52] U.S. Cl. ................................. 137/556; 251/149.8;
285/308
[58] Field of Search ................. 251/149.8, 149.9, 89.5;
137/614.03, 614.05, 614.06, 556; 285/307, 308,
321, DIG. 2

[56] References Cited

U.S. PATENT DOCUMENTS

| | | | |
|---|---|---|---|
| 2,073,048 | 3/1937 | Clark | 251/89.5 |
| 3,005,468 | 10/1961 | Erwin et al. | 137/556 |
| 3,714,962 | 2/1973 | Sauer et al. | 251/149.8 |
| 4,009,729 | 3/1977 | Vik | 137/614.05 |
| 4,181,150 | 1/1980 | Maldavs | 137/614.06 |

FOREIGN PATENT DOCUMENTS 2547411 4/1977 Fed. Rep. of Germany ...... 285/321

*Primary Examiner*—A. Michael Chambers
*Attorney, Agent, or Firm*—Lerner, David, Littenberg & Samuel

[57] ABSTRACT

A pipe coupling made up of separably assembled plug and socket in which a latching piece is suspensibly held in the socket in latching engagement with the plug so that finger pressure on the latching piece drives it out of the latching engagement in order to enable easy disassembly of the pipe coupling. A flow rate adjuster piece may be incorporated into the socket so that its axial turing changes the extent of recession of a valve off a valve seat in the plug so that the flow rate can be adjusted while retaining the assembled state of the pipe coupling. Light, compact and cheap construction is assured with simple operation and free flow rate adjustment.

16 Claims, 12 Drawing Figures

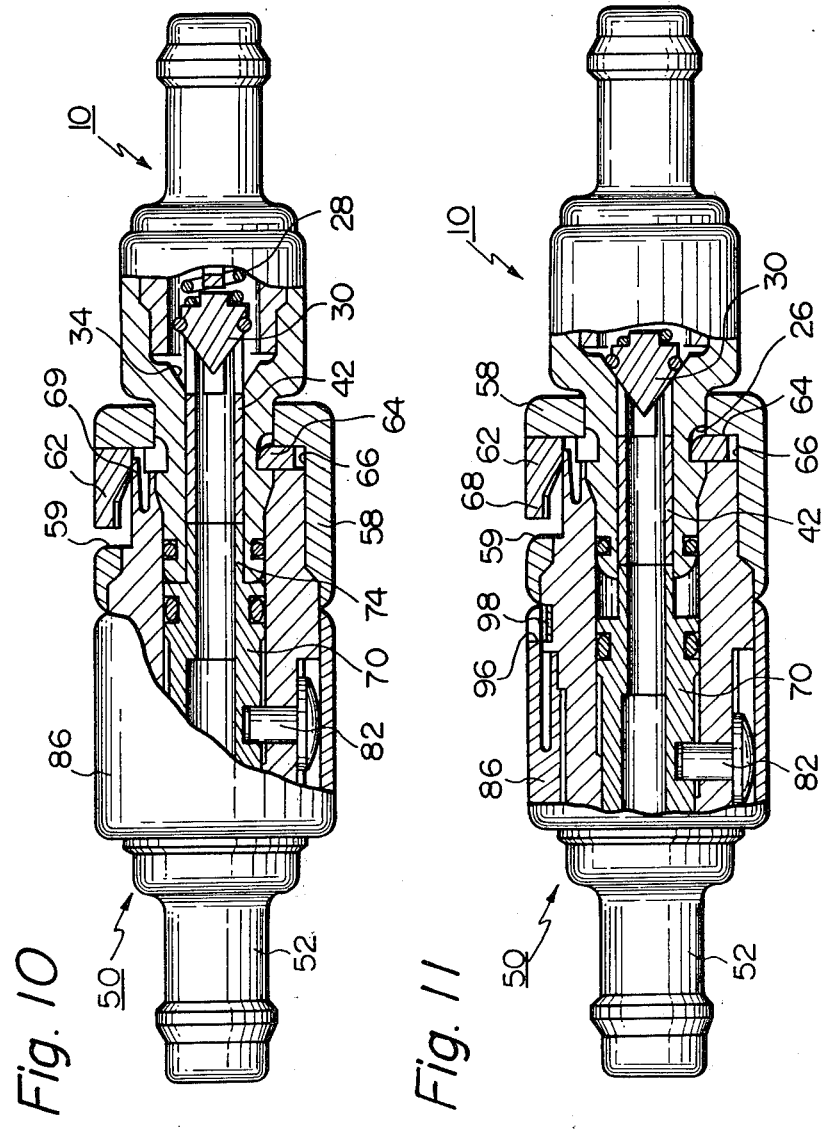

PIPE COUPLING

DESCRIPTION OF THE BACKGROUND

The present invention relates to improved pipe coupling, and more particularly relates to improved construction of a pipe coupling made of a plug and socket separably assembled with each other.

Conventionally, metallic materials are in general used for major elements of a pipe coupling and assembly of these elements is mostly based upon screw engagements or projection-hollow engagements. Such manner of assembly requires application of delicate machining after initial shaping of the elements in manufacturing, and also requires complicated operation for assembly and disassembly of the pipe coupling in use.

In practice, it is often required to adjust flow rate of fluid passing through a piping system including the pipe coupling. Conventionally, a separate cock is connected to the pipe coupling in order to enable such adjustment of the flow rate. Addition of such a cock inevitably results in a complicated and enlarged construction of the pipe coupling and its related parts in the piping system.

SUMMARY OF THE INVENTION

It is one object of the present invention to provide a pipe coupling which can be manufactured very easily.

It is another object of the present invention to provide a pipe coupling which can be very easily operated in use.

It is the other object of the present invention to provide a pipe coupling which enables free adjustment of flow rate despite its very simple, light and compact construction.

In accordance with the present invention, there is provided a plug and a socket releaseably attached to the plug. The plug includes a tubular nose section having a front end, a rear end, an outer surface, an internal valve seat formed within the nose section between the front and rear ends thereof, an annular latching groove formed in the outer surface of the nose section between the front and rear ends thereof, an axial conduit extending through the nose section from the front end thereof to the valve seat and a conical flange projecting outwardly from the outer surface of the nose section between the latching groove and the front end of the nose section. The plug also includes a tubular tail section having a front end attached to the rear end of the nose section in a fluid-tight manner, a rear end, a fore conduit formed in the front end of the tail section and communicating with the axial conduit in the nose section and an aft conduit formed in the rear end of the tail section and communicating with the fore conduit formed in the front end of the tail section, and a valve. The valve has a main body moveably received in the fore conduit of the tail section and a tubular extension attached to the main body and slideably received in the axial conduit of the nose section, at least one radial opening formed in the extension adjacent to the main body, an axial opening formed in the extension and communicating at one end with the radial opening and at an opposite end with the axial conduit of the nose section and urging means for urging the main body from a first position in which the radial opening or openings communicate with the fore conduit of the tail section, whereby the axial and radial openings in the extension of the valve cooperate with the axial conduit in the nose section and the fore and aft conduits in the tail section to form a fluid flow path through the plug, towards a second position in which the main body engages the valve seat formed in the nose section, whereby the fluid flow path through the plug is closed.

The socket includes a tubular main member having a front end sized and shaped so as to releaseably receive the front end of the nose section of the plug, a rear end, an internal projection extending axially with the main member, an axial conduit extending between the projection and the rear end of the main member and communicating with the axial opening in the extension of the valve of the tail section of the plug and a substantially flat resilient tongue projecting outwardly from the front end of the main member. The socket also includes a tubular mantle member positioned over the front end of the main member so as to form an annular space between the mantle member and the front end of the main member and having a radial opening in alignment with the tongue of the main member. The socket also includes a latching member having a ring section positioned in the annular space for radial movement between a first position in which the annular ring engages the latching groove of the nose section of the plug, whereby the plug and the socket are coupled together, and a second position in which the annular ring disengages the latching groove of the nose section of the plug, whereby the plug and the socket may be uncoupled, and a tongue section positioned in the radial opening of the mantle member and supported by the tongue of the main member such that the ring section assumes its first position when the tongue of the main member is in an unflexed state and such that the ring section assumes its second position when the tongue of the main member is flexed as a result of the manual depression of the tongue section of the latching member of the socket.

In order to be able to regulate the flow rate of fluid flowing through the coupling, the projection of the main member of the socket is moveably positioned within the main member and the socket is provided with adjusting means for adjusting the position of the projection. More particularly, the projection engages the extension of the valve of the tail section of the plug to move the main body of the valve into its first position, thereby permitting fluid to flow through the coupling. In one embodiment, the adjusting means includes a pin inserted into a recess formed in the projection through a helical guide slot formed in the main member of the socket.

BRIEF DESCRIPTION OF THE DRAWINGS

FIG. 10 is a side view, partly in section, of the pipe coupling made up of the plug in FIG. 1 and the socket in FIG. 7 in one firmly assembled state in which the flow rate is highest, FIG. 11 is a side view, partly in section, of the pipe coupling in FIG. 10 in another firmly assembled state in which the flow rate is minimal, more clearly naught.

DESCRIPTION OF THE PREFERRED EMBODIMENTS

As briefly described already, the pipe coupling of the present invention is made up of a plug and a socket detachably assembled with each other. In the following descriptions, the side of either of the elements adapted for assembly with another of the element will be referred to with words such as front and fore, and the opposite side with words such as back and rear.

Figure 1:
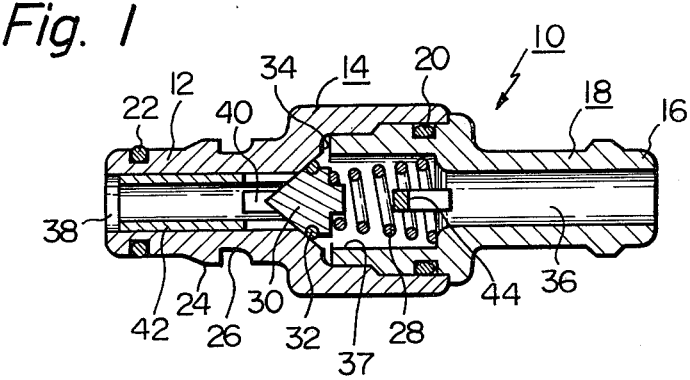
FIG. 1 is a sectional side view of one embodiment of the plug in accordance with the present invention.

One embodiment of the plug in accordance with the present invention is shown in FIG. 1. A plug 10 is made up of a tubular fore piece 14 and a tubular rear piece 18 fixedly coupled, preferably by fusion, to each other by means of a seal ring 20. The pieces 14 and 18 are both preferably made of a synthetic resin.

The fore piece 14 is provided with a nose section 12 to be inserted into a socket when the pipe coupling is assembled. Near the front end, the nose section 12 is externally provided with a seal ring 22, a conical flunge 24 and an annular latching groove 26 formed just on the back side of the flange 24. The fore piece 14 further internally defines an axial fore conduit 38 for the fluid flowing through the pipe coupling.

The rear piece 18 is provided with a tail section 16 adapted for connection with any suitable hose. The rear piece 18 is further internally defines an axial rear conduit 36 for the fluid flowing through the pipe coupling, and an intermediate conduit 37 of a larger diameter.

A valve 30 having a conical head is arranged about the junction between the pieces 14 and 18 with its seal ring 32 in pressure contact with a funnel-shaped seat 34 formed on the internal surface of the fore piece 14. This pressure contact is caused by a helical compression spring 28 interposed between the valve 30 and the rear end of the intermediate conduit 37. An axial projection 44 is formed on the rear end of the intermediate conduit 37 in order to limit excessive rearward movement of the valve 30. The valve 30 is provided with tubular front extension 42 slidably received in the fore conduit 38 of the fore piece 14. The front extension 42 terminates near the front opening of the fore conduit 38 and, at a position near the conical head of the valve 30, is provided with at least one radial opening 40.

Figure 2:
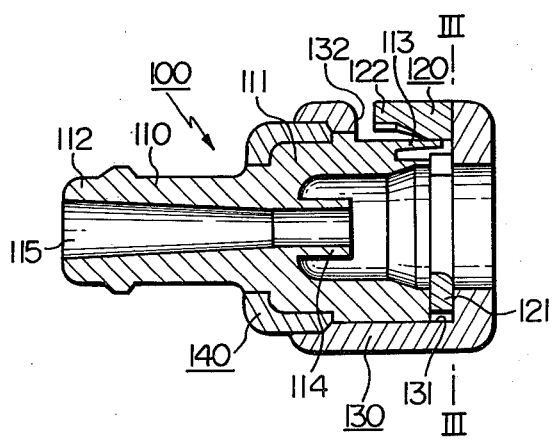
FIG. 2 is a sectional side view of one embodiment of the socket in accordance with the present invention.
Figure 3:
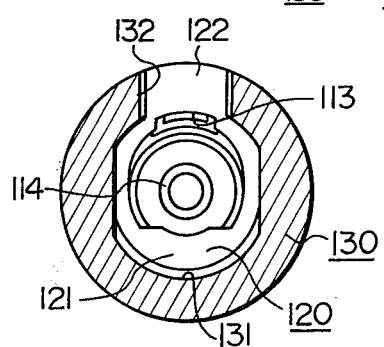
FIG. 3 is a section taken along a line III—III in FIG. 2.
Figure 4:
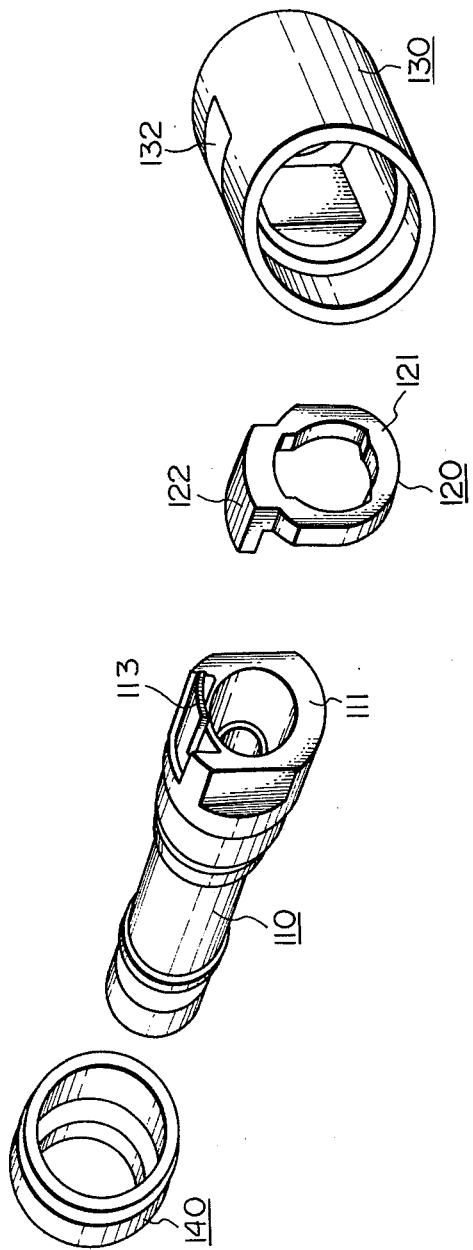
FIG. 4 is a perspective view of the socket shown in FIG. 2 in a disassembled state.

One embodiment of the socket in accordance with the present invention is shown in FIGS. 2, 3 and 4. A socket 100 is made up of a tubular main piece 110, a latching piece 120, a mantle piece 130 and a stop piece 140. These pieces 110 and 140 are all preferably made of a synthetic resin. In particular, at least the main piece 110 should be made of a synthetic resin since it is required to be somewhat resilient as hereinafter described in more detail.

The main piece 110 is provided with a front nose section 111 adapted for accommodating the nose section 12 of the plug 10 and a tail section 112 adapted for connection with any hose. The nose section 111 is provided, near its periphery, with a tongue 113 projecting forwards, and, near its center, a center projection 114. The main piece 110 internally defines an axial conduit 115 which opens in the center projection 114.

The mantle piece 130 is internally designed so that, when it is inserted over and fixed to the nose section 111 of the main piece 110, an annular groove 131 is left in front of the front end of the nose section 111. A radial opening 132 is formed in the wall of the mantle piece 130.

The latching piece 120 includes a ring section 121 and a tongue 122 extending rearwards from the ring section 121 as best seen in FIG. 4. In the assembled state of the socket 100, the stop piece 140 is inserted over and fixed to the rear end portion of the nose section 111 of the main piece 110 in order to prevent falling of the mantle piece 130 inserted over the main piece 110. The tongue 122 of the latching piece 120 rests on the tongue 113 of the main piece 110 so that the latching piece 120 is suspensibly held by the main piece 110. In this state, the ring section 121 of the latching piece 120 is received partly in the annular groove 131 provided by the mantle piece 130 as shown in FIG. 2. Further, the tongue 122 of the latching piece 120 appears in the radial opening 132 of the mantle piece 130 with its outer surface substantially flush with that of the mantle piece 130.

Assembly of the pipe coupling using the plug 10 in FIG. 1 and the socket 100 in FIG. 2 is carried out as follows.

As the nose section 12 of the plug 10 is inserted into the nose section 111 of the main piece 110 of the socket 100, the ring section 121 of the latching piece 120 is depressed into the annular groove 131 due to pressure abutment with the conical flunge 24 of the plug 10 and the tongue 122 of the latching piece 120 sinks in the radial opening 132 of the mantle piece 130 while bending the resilient tongue 113 of the main piece 110. Due to the above-described pressure abutment with the conical flange 24 of the plug 10, the ring section 121 of the latching piece 120 is now fully placed in the annular groove 131 provided by the mantle piece 130 to allow further insertion of the plug 10 into the socket 100.

Figure 5:
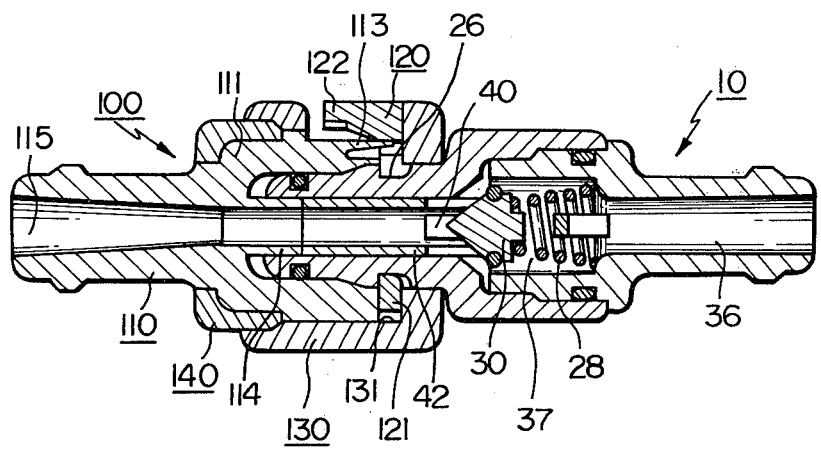
FIG. 5 is a side sectional view of the pipe coupling made up of the plug in FIG. 1 and the socket in FIG. 2 in the firmly assembled state.

As the latching groove 26 of the plug 10 arrived at the position of the annular groove 131, the ring section 121 of the latching piece 120 automatically falls into the latching groove 26 of the plug 10 due to spring-back of the resilient tongue 113 which is now released from the pressure contact with the tongue 122 of the latching piece 120. Consequently, the plug 10 and the socket 100 are now firmly assembled together as shown in FIG. 5.

In this assembled state, the front end of the center projection 114 of the socket 100 abuts against the front end of the front extension 42 of the valve 30 and pushes the valve 30 rearwards off the seat 34 while overcoming the repulsion of the compression spring 28. Thus, a continuous flow passage is established through the pipe coupling, which includes the rear and intermediate conduits 36 and 37, a clearance formed between the conical head of the valve 30, the radial openings 40 in the front extension 42, the interior of the front extension 42, and the conduit 115 of the socket 100.

Figure 6:
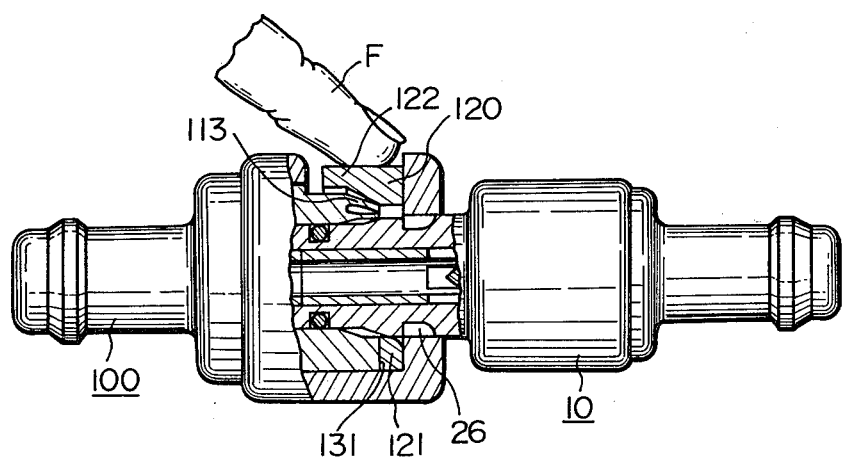
FIG. 6 is a side view, partly in section, of the pipe coupling in FIG. 5 in the state ready for disassembly.

Under the condition shown in FIG. 6, the tongue 122 of the latching piece 120 is depressed by a finger F towards the axis of the pipe coupling while bending the flexible tongue 113 of the main piece. By this depression, the ring section 121 is brought out of engagement with the latching groove 26 of the plug 10 and placed fully within the annular groove 131 of the socket. Due to disappearance of the latching engagement, the plug 10 and the socket 100 can easily be disassembled from each other.

In accordance with the present invention, at least the main piece 110 of the socket 100, more preferably both the entire plug 10 and socket 100, is made of a resilient material such as synthetic resin. For example, the known plastic injection moulding may be used for manufacturing the pipe coupling. This greatly simplifies manufacturing of the pipe coupling whilst naturally causing corresponding lowering in manufacturing cost.

The latching piece 120 is suspensibly held by the resilient tongue 113 of the socket 100 with its outer surface being substantially flush with that of the socket. This flush construction successfully avoids accidental depression of the latching piece 120, i.e. accidental disassembly of the pipe coupling, by application of any unexpected external force. The flush construction further provides a simple outer design of the pipe coupling.

Disassembly of the pipe coupling is carried out utilizing the resilient nature of the tongue 113 of the socket without requirement for provision of any additional spring to that effect. This also contributes to lowering in manufacturing cost.

It will be well understood with the foregoing embodiment that the flow rate of the fluid passing through the pipe coupling in the assembled state is determined by the dimension of the annular clearance formed around the conical head of the valve 30 in FIG. 5. In the case of the foregoing embodiment, the dimension of this clearance is fixed once the mechanical design of the pipe coupling is fixed.

Figure 7:
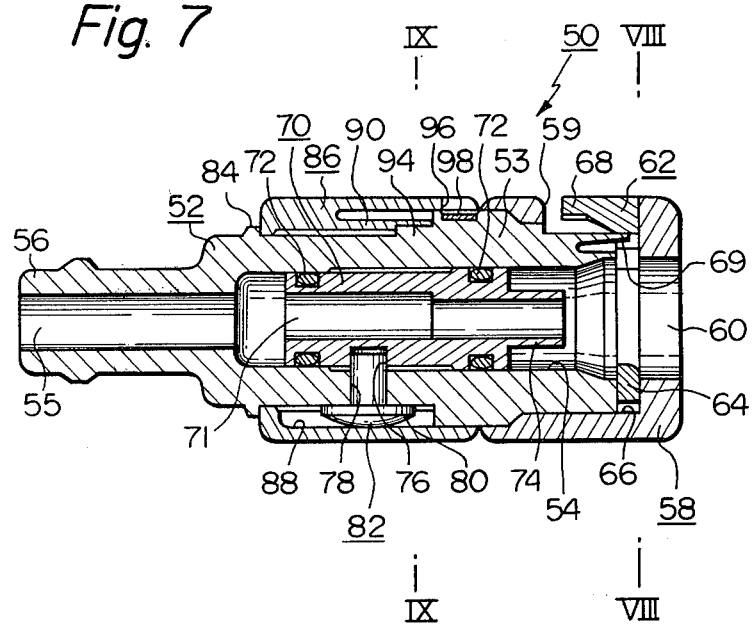
FIG. 7 is a side sectional view of the other embodiment of the socket in accordance with the present invention.

Another embodiment of the socket shown in FIG. 7 enables adjustment of the flow rate even with the fixed mechanical design of the pipe coupling.

A socket 50 includes a main piece 52, a mantle piece 58, a latching piece 62, a flow rate adjuster piece 86 and a valve pressor piece 70. At least the main piece 52 and the adjuster piece 86, more preferably all the pieces, are made of a resilient material such as synthetic resin.

Figure 12:
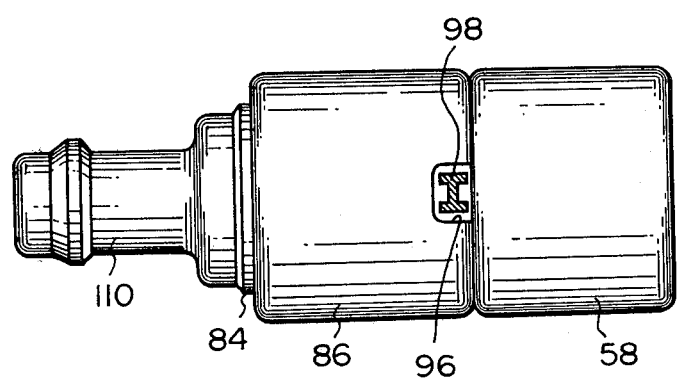
FIG. 12 is an outer view of the socket shown in FIG. 7.

The main piece 52 is provided with a nose section 53 adapted for receiving the nose section 12 of the plug 10, and a tail section 56 adapted for connection with any hose. The main piece 52 further internally defined a fore conduit 54 of a large diameter and a rear conduit 55 of a small diameter in axial communication with each other. At a position near the tail section 56, a small flange 84 is formed on the main piece 52 for snap coupling with the adjuster piece 86. The nose section 53 is provided with a tongue 69 projecting forwards. A guide slot 78 is formed through the wall of the main piece 52, which extends spirally over a prescribed length. A flow rate indicator band 98 is disposed to the outer surface of the main piece 52. This indicator band 98 extends in the peripheral direction and includes flow rate indications. One example of such an indication is shown in FIG. 12, in which H designates high flow rate.

The mantle piece 58 is fixedly inserted over the nose section 53 of the main piece 52 in an arrangement such that an annular groove 66 is left in front of the fore end of the nose section 53. A radial opening 59 is formed in the mantle piece 58 in order to receive the latching piece 62 as hereinafter described in more detail. An axial conduit 60 is formed in the mantle piece 58 in communication with the fore conduit 54 of the main piece 52.

Figures 8, 9:
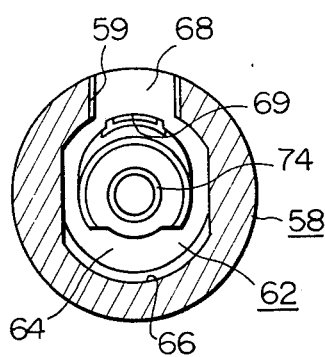
FIG. 8 is a section taken along a line VIII—VIII in FIG. 7.
FIG. 9 is a section taken along a line IX—IX in FIG. 7.

The latching piece 62 includes a ring section 64 received in the annular groove 66 provided by the mantle piece 58, and a tongue 68 extending rearwards and located in the radial opening 59 of the mantle piece 58. Under the condition shown in the drawing, the tongue 68 of the latching piece 62 rests on the tongue 69 of the main piece 52. In other words, the latching piece 62 is suspensibly supported by the main piece 52 in the mantle piece 58 as shown in FIG. 8. Here, the exposed outer surface of the latching piece 62 is substantially flush with that of the mantle piece 58.

The valve pressor piece 70 is slidably inserted into the fore conduit 54 of the main piece 52 by means of seal rings 72. The pressor piece 70 is provided with a center projection 74 extending forwards, and an axial conduit 71 opening in the center projection 74. This pressor piece 70 is provided, in its outer surface, with a recess 76.

The flow rate adjuster piece 86 is inserted over the middle section of the main piece 52 and internally defines a guide groove 88 extending in the axial direction. A guide pin 82 is inserted into the recess 76 of the pressor piece 70 via the guide slot 78 of the main piece 52 with its head 80 being received in the guide groove 88 of the adjuster piece 86. The adjuster piece 86 is designed so that its inner surface is in tight pressure contact with the head 80 of the guide pin 82. Consequently, as the adjuster piece 86 is axially turned about the main piece 52, the guide pin 82 revolves helically about the axis of the main piece 52 due to the helical arrangement of the guide slot 78 and this helical revolution of the guide pin 82 causes axial movement of the pressor piece 70 by means of the engagement of the guide pin 82 with the recess 76 in the pressor piece 70.

As best seen in FIGS. 7 and 9, the adjuster piece 86 is further internally provided with a tongue 90 which extends forwards. Axially extending grooves 92a, 92b and so on are formed in the inner surface of the tongue 90 at prescribed, preferably equal, intervals in the periphery direction. A projection 94 is formed on the outer surface of the main piece 52, which is adapted for snap engagement with any of the grooves 92a, 92b and so on.

As an alternative, like grooves may be made in the outer surface of the main piece 52 and a like projection on the inner surface of the tongue 90.

At a position corresponding to the flow rate indicator band 98 on the main piece 52, a radial opening 96 is formed through the adjuster piece 86 so that each flow rate indication is visible from outside. It will be well understood that the interval between adjacent grooves, e.g. 92a and 92b, should be equal to that between the adjacent flow rate indications.

The socket 50 shown in FIG. 7 is adapted for assembly with the plug 10 shown in FIG. 1.

In order to assemble the pipe coupling, the nose section 12 of the plug 10 is inserted into the fore conduit 54 of the socket 50, the conical flange 24 of the plug 10 depresses the ring section 64 of the latching piece 62 into the annular groove 66 provided by the mantle piece 58 and the tongue 69 of the main piece 52 flexes towards the axis of the pipe coupling being pressed by the latching piece 62. This procedure is substantially same as that shown in FIG. 6, in which the latching piece 62 is depressed by the finger F.

Further insertion of the plug 10 brings the latching groove 26 in the plug 10 to the position of the annular groove 66. Then, the ring section 64 of the latching piece 62 automatically slips into the latching groove 26 in the plug 10 due to the spring-back of the resilient tongue 69 of the main piece 52. Thus, the plug 10 and the socket 50 are firmly assembled together as shown in FIG. 10.

Under this condition, the flow rate is set to the highest level and the indication H appears in the radial opening 98 of the adjuster piece 86 as shown in FIG. 12. The center projection 74 of the pressor piece 70 is inserted into the fore conduit 38 of the plug 10 and pushes the valve 30 rearwards off the valve seat 34 by means of the front extension 42 while overcoming the repulsion of the compression spring 28. Consequently, a folw passage is established through the pipe coupling, which includes the conduits 36, 37 and 38 of the plug 10, the clearance between the conical head of the valve 30 and the valve seat 34, the axial conduit 71 of the pressor piece 70, and the conduits 54 and 55 of the socket 50.

As described already, the flow rate of the fluid passing through the pipe coupling is set to the highest level in the situation shown in FIG. 10. Assuming that the groove 92a in FIG. 9 corresponds to the highest folw rate level, and the groove 92b the lowest flow level, i.e. the naught flow rate, the axial position of the pressor piece 70 changes as the adjuster piece 86 is axially turned about the main piece 52. That is, the pressor piece 70 moves rearwards as the adjuster piece 86 is turned from the position shown in FIGS. 9 and 10. With this turning of the adjuster piece 86, different flow rate indications appear in the radial opening 98 in the adjuster piece 96 so that an operator can recognize the flow rate to be selected. The above-described axial movement of the pressor piece 70 is caused by engagement of the guide pin 82 with the recess 76 in the pressure piece 70 by means of the helical guide slot 78 in the main piece 52, and by the pressure contact of the guide pin 82 with the adjuster piece 86.

Under the condition shown in FIG. 11, the projection 94 on the main piece 52 is in engagement with the groove 92d in the tongue 90 of the adjuster piece 86 and the flow rate is set to naught. Possibly an indication such as "L" may appear in the radical opening 96 in the adjuster piece 86. In this situation, the pressor piece 70 is registered at the rearmost position and, despite the contact between the pressor piece center projection 74 and the valve front extension 42, the valve 30 remains in contact with the valve seat 34. In other words, passage of the fluid through the pipe coupling can be blocked even retaining the assembled state of the pipe coupling.

When the tongue 68 of the latching piece 62 is depressed by the operators finger F under the condition shown in FIG. 11, the ring section 64 of the latching piece 62 is forced to fully sink in the annular groove 66 of the socket 50 off the latching engagement with the latching groove 26 in the plug 10 so that the pipe coupling can easily be disassembled.

For flow rate adjustment in the prior art, it is necessary to attach an additional flow rate adjuster such as a cock to the pipe coupling and this caused a complicated and enlarged construction of the pipe coupling and its related parts in the piping system.

In accordance with the present invention, the valve is provided with the dual functions, one blocking and opening of the flow passage and the other adjustment of the flow rate. Such dual functions are provided by the related mechanism fully encased within the pipe coupling itself. This greatly simplifies and minimizes the construction of the pipe coupling and its related parts in the piping system.

It should be well appreciated also that, in accordance with the present invention, the above-described flow rate adjustment is carried out whilst causing no disassembly of the pipe coupling. Only a simple finger action for axially turning the adjuster piece 86 enables such flow rate adjustment.

As the guide pin 82 is tightly pressed by the inner surface of the resilient adjuster piece 86, accidental movement of the guide pin 82 is well avoided. Further, frictional contact between the seal rings 72 on the pressor piece 70 and the wall defining the fore conduit 54 of the socket 50 also hinders unexpected movement of the guide pin 82. In other words, except for the intended finger action on the adjuster piece 86, selected flow rate can be retained without any unexpected change.

I claim:

1. A pipe coupling, comprising a plug and a socket releaseably attached to said plug, said plug including a tubular nose section having a front end, a rear end, an outer surface, an internal valve seat formed within said nose section between said front and rear ends thereof, an annular latching groove formed in said outer surface of said nose section between said front and rear ends thereof, an axial conduit extending through said nose section from said front end thereof to said valve seat and a conical flange projecting outwardly from said outer surface of said nose section between said latching groove and said front end of said nose section, a tubular tail section having a front end attached to said rear end of said nose section in a fluid-tight manner, a rear end, a fore conduit formed in said front end of said tail section and communicating with said axial conduit in said nose section and an aft conduit formed in said rear end of said tail section and communicating with said fore conduit formed in said front end of said tail section and a valve having a main body moveably received in said fore conduit of said tail section, a tubular extension attached to said main body and slideably received in said axial conduit of said nose section, at least one radial opening formed in said extension adjacent to said main body, an axial opening formed in said extension and communicating at one end with said at least one radial opening and at an opposite end with said axial conduit of said nose section and urging means for urging said main body from a first position in which said at least one radial opening communicates with said fore conduit of said tail section, whereby said axial and radial openings in said extension of said valve cooperate with said axial conduit in said nose section and said fore and aft conduits in said tail section to form a fluid flow path through said plug, towards a second position in which said main body engages said valve seat formed in said nose section, whereby said fluid flow path through said plug is closed, said socket including a tubular main member having a front end sized and shaped so as to releasably receive said front end of said nose section of said plug, a rear end, an internal projection extending axially within said main member, an axial conduit extending between said projection and said rear end of said main member and communicating with said axial opening in said extension of said valve of said tail section of said plug and a substantially flat resilient tongue projecting outwardly from said front end of said main member, a tubular mantle member positioned over said front end of said main member so as to form an annular space between said mantle member and said front end of said main member and having a radial opening in alignment with said tongue of said main member, and a latching member having a ring section positioned in said annular space for radial movement between a first position in which said annular ring engages said latching groove of said nose section of said plug, whereby said plug and said socket are coupled together, and a second position in which said annular ring disengages said latching groove of said nose section of said plug, whereby said plug and said socket may be uncoupled, and a tongue section positioned in said radial opening of said mantle member and supported by said tongue of said main member such that said ring section assumes its first position when said tongue of said main member is in an unflexed state and such that said ring section assumes its second position when said tongue of said main member is flexed as a result of the manual depression of said tongue section of said latching member of said socket.

2. A pipe coupling according to claim 1, wherein said projection of said main member of said socket engages said extension of said valve of said tail section of said plug to move said main body of said valve out of engagement with said valve seat formed within said nose section of said plug.

3. A pipe coupling according to claim 2, wherein said projection is moveably positioned within said main member of said socket, said socket including adjusting means for adjusting the position of said projection to regulate the flow rate of fluid flowing through said coupling.

4. A pipe coupling according to claim 3, wherein said projection engages said extension to move said main body of said valve into its first position, thereby permitting fluid to flow through said coupling.

5. A pipe coupling according to claim 3, wherein said adjusting means includes a pin inserted into a recess formed in said projection through a helical guide slot formed in said main member of said socket.

6. A pipe coupling according to claim 5, wherein said adjusting means includes a tubular adjusting member rotatably positioned on said main member and in contact with said pin and locking means for locking said adjusting member in a predetermined angular position relative to said main member.

7. A pipe coupling according to claim 6, wherein said locking means includes a tongue extending axially from said adjusting member, said tongue of said adjusting member including a plurality of axially extending grooves, and an axially extending projection formed on said main member and selectively engageably with any one of said grooves in response to the rotation of said adjusting member relative to said main member.

8. A pipe coupling according to claim 6, wherein said locking means includes a tongue extending axially from said adjusting member, said tongue of said adjusting member having an axially extending projection, and a plurality of axially extending grooves formed in said main member, said projection on said tongue of said adjusting member being selectively engageable with any one of said grooves in response to the rotation of said adjusting member relative to said main member.

9. A pipe coupling according to claim 6, further comprising indicating means for visibly indicating the flow rate of fluid flowing through said coupling.

10. A pipe coupling according to claim 9, wherein said indicating means includes a flow rate indicator band positioned over said mean member and a radial opening formed in said adjusting member in registry with a portion of said indicator band, whereby said portion of said indicator band is visible through said radial opening in said adjusting member.

11. A pipe coupling according to claim 1, wherein said latching member is substantially flush with said mantle member when said tongue section of said latching member is in its unflexed state.

12. A pipe coupling according to claim 1, wherein said main member of said socket is made from a resilient material.

13. A pipe coupling according to claim 12, wherein said resilient material is a synthetic resin.

14. A pipe coupling according to claim 1, wherein at least one of said plug and said socket is made entirely of a resilient material.

15. A pipe coupling according to claim 14, wherein said resilient material is a synthetic resin.

16. A pipe coupling according to claim 1, wherein said tongue of said main member, as a result of its resiliency, automatically assumes said unflexed state, thereby automatically urging said ring section of said latching member into its first position.

* * * * *